(12) United States Patent
Liu et al.

(10) Patent No.: US 11,581,539 B2
(45) Date of Patent: Feb. 14, 2023

(54) NATURAL GRAPHITE-BASED MODIFIED COMPOSITE MATERIAL, PREPARATION METHOD THEREFOR, AND LITHIUM ION BATTERY COMPRISING MODIFIED COMPOSITE MATERIAL

(71) Applicant: BTR NEW MATERIAL GROUP CO., LTD., Guangdong (CN)

(72) Inventors: Xingyang Liu, Guangdong (CN);
Haihui Zhou, Guangdong (CN);
Dongdong Li, Guangdong (CN);
Chengkun Zhou, Guangdong (CN);
Jianguo Ren, Guangdong (CN);
Youyuan Huang, Guangdong (CN);
Min Yue, Guangdong (CN)

(73) Assignee: BTR NEW MATERIAL GROUP CO., LTD., Guangdong (CN)

( * ) Notice: Subject to any disclaimer, the term of this patent is extended or adjusted under 35 U.S.C. 154(b) by 387 days.

(21) Appl. No.: 16/753,094

(22) PCT Filed: Nov. 29, 2018

(86) PCT No.: PCT/CN2018/118100
§ 371 (c)(1),
(2) Date: Apr. 2, 2020

(87) PCT Pub. No.: WO2019/114554
PCT Pub. Date: Jun. 20, 2019

(65) Prior Publication Data
US 2020/0266443 A1 Aug. 20, 2020

(30) Foreign Application Priority Data
Dec. 13, 2017 (CN) .......................... 201711330054.4

(51) Int. Cl.
*H01M 4/02* (2006.01)
*H01M 4/587* (2010.01)
(Continued)

(52) U.S. Cl.
CPC ........... *H01M 4/587* (2013.01); *C01B 32/205* (2017.08); *C01B 32/21* (2017.08); *H01M 4/366* (2013.01);
(Continued)

(58) Field of Classification Search
CPC ...................................................... H01M 4/02
See application file for complete search history.

(56) References Cited

U.S. PATENT DOCUMENTS

2002/0197534 A1  12/2002  Fukuda et al.

FOREIGN PATENT DOCUMENTS

CN  101209837  7/2008
CN  101685858 A  3/2010
(Continued)

OTHER PUBLICATIONS

International Search Report issued in related PCT/CN2018/118100, dated Feb. 27, 2019.
(Continued)

*Primary Examiner* — Jacob B Marks
(74) *Attorney, Agent, or Firm* — Barnes & Thornburg LLP; Jeffrey R. Stone

(57) ABSTRACT

A natural graphite-based modified composite material, a preparation method therefor, and a lithium ion battery comprising the modified composite material. The natural graphite-based modified composite material comprises natural graphite and non-graphitized carbon coated on the inner and outer surfaces of the natural graphite. The preparation method comprises: (1) subjecting spherical natural graphite to isotropic treatment; (2) performing granularity control
(Continued)

and shaping treatment; (3) subjecting the inner surface and the outer surface of the material obtained in step (2) to simultaneous modification; and (4) performing carbonization, so as to obtain a natural graphite-based modified composite material.

18 Claims, 1 Drawing Sheet

(51) Int. Cl.
    *C01B 32/205*     (2017.01)
    *C01B 32/21*     (2017.01)
    *H01M 4/36*     (2006.01)
    *H01M 10/0525*     (2010.01)

(52) U.S. Cl.
    CPC ..... *H01M 10/0525* (2013.01); *C01B 2204/22* (2013.01); *C01B 2204/32* (2013.01); *C01P 2004/84* (2013.01); *H01M 2004/027* (2013.01)

(56) References Cited

FOREIGN PATENT DOCUMENTS

| CN | 102280629 | A | 12/2011 |
|---|---|---|---|
| CN | 103682258 | | 3/2014 |
| CN | 20160626244 | * | 8/2016 |
| CN | 106169584 | | 11/2016 |
| CN | 106252625 | A | 12/2016 |
| CN | 106629702 | A | 5/2017 |
| CN | 108063229 | | 5/2018 |
| EP | 2007141677 | | 6/2007 |
| JP | 2014067636 | A | 4/2014 |
| JP | 2016111021 | A | 6/2016 |

OTHER PUBLICATIONS

Office Action issued by the Chinese Patent Office, Application No. 201711330054.4, dated Nov. 14, 2019.
Office Action issued by the Chinese Patent Office, Application No. 201711330054.4, dated Apr. 7, 2020.
Search Report issued by the European Patent Office, Application No. 18888693.1, dated Sep. 17, 2021.
Hongyu Wang et al., 2002, J. Electrochem. Soc. 149 A499, XP55832353A, "Characterization of Carbon-Coated Natural Graphite as a Lithium-Ion Battery Anode Material".
Office Action issued by the Japanese Patent Office, Application No. 2019-547694, dated Oct. 20, 2020.

\* cited by examiner

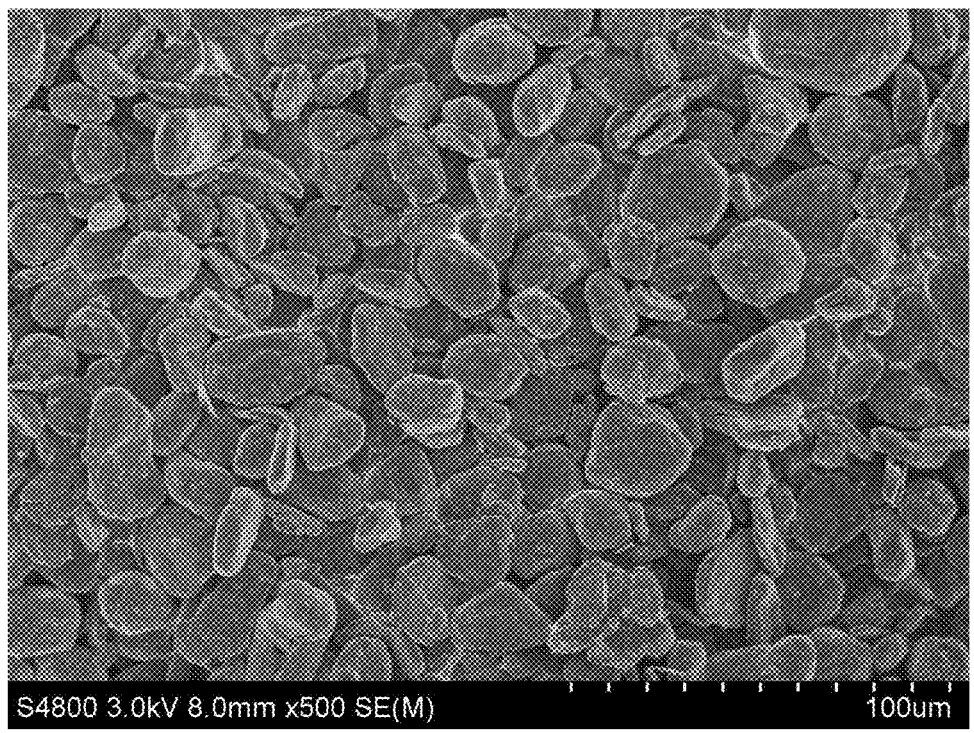

NATURAL GRAPHITE-BASED MODIFIED COMPOSITE MATERIAL, PREPARATION METHOD THEREFOR, AND LITHIUM ION BATTERY COMPRISING MODIFIED COMPOSITE MATERIAL

TECHNICAL FIELD

The present application relates to the technical field of anode materials for lithium ion batteries, and involves a natural graphite-based modified composite material, and a preparation method and application thereof, e.g. a natural graphite-based modified composite material, and a preparation method and lithium ion battery comprising the modified composite material.

BACKGROUND

With the intensification of environmental pollution and the reduction of fossil energy stocks, there is an urgency to establish a new lifestyle that does not rely on fossil fuels, especially in the field of transportation. The development of pure electric vehicles is considered the general trend. Among many secondary battery systems, lithium ion batteries are considered to be the most promising power batteries due to their high energy density, high operating voltage, long-cycle stability, and no memory effect.

Lithium ion batteries are mainly composed of a negative electrode, an electrolyte, a separator, and a positive electrode. Among them, the positive and negative electrodes have a decisive influence on the performance of the battery. For anode materials, graphite is still the dominant material at the present stage. Graphite can be subdivided according to the sources into artificial graphite and natural graphite. Natural graphite dominates the main market of 3C product lithium battery anode materials due to its advantages such as high-quality capacity, high compacted density, low price and wide source. However, its performance needs to be further improved in the process of applying it to power batteries, especially the rate performance. Natural graphite generally refers to flaky graphite, which is scaly. Such materials are generally parallel to the pressurized surface after being pressed. The performance in the electrode is that the flaky graphite is parallel to the current collector, thereby reducing the electrolyte permeability of the material, which is very detrimental to the battery's rate performance. How to achieve the isotropy of flaky graphite is one of the research focuses to improve the performance of graphite anode materials.

CN101685858A discloses a negative electrode material for a lithium ion secondary battery and a manufacturing method thereof. The method adopts natural spherical graphite as a raw material and applies isotropic pressure to obtain a natural graphite electrode material with high isotropy. This method can effectively construct isotropic materials. However, the flake graphite will be further broken and fractured during the preparation process, so as to expose more defect sites on the spherical surface and inside, resulting in poor electrode material cycle performance. Moreover, the increase in material density will further increase the electrode expansion rate.

CN103477476A discloses a non-aqueous secondary battery negative electrode carbon material, a negative electrode, and a non-aqueous secondary battery. On the basis of the above CN101685858A, the patent discloses further surface-processing the isotropic material obtained by high-pressure treatment. The further surface treatment improves the performance of the material. However, the cycling performance of the material is not qualitatively improved since the method does not improve the material defect sites. In addition, neither discloses the effect of increasing the isotropy of the material on the electrode expansion rate.

SUMMARY

The following is a summary of the subject matter detailed in the present application. The summary is not intended to limit the protection scope of the claims.

The present application aims to provide a natural graphite-based modified composite material, a preparation method thereof, and a lithium ion battery comprising the modified composite material. The natural graphite-based modified composite material of the present application realizes the simultaneous modification of defect sites on the inner and outer surfaces, which greatly improves the cycle stability of natural graphite and reduces the expansion of the natural graphite electrode. The preparation method of the present application has a simple process, easy operation, low cost and high practicability, and has broad application prospects in the field of lithium ion batteries for mobile electronic devices such as mobile phones and digital cameras.

In order to achieve the above purpose, the following technical solutions are used in the present application.

In the first aspect, the present application provides a natural graphite-based modified composite material, which comprises natural graphite and non-graphitizable carbon covering the inner and outer surfaces of the natural graphite.

Optionally, the non-graphitizable carbon is converted from a modifier through carbonization treatment.

Optionally, the modifier is a modifier having a softening point between 20° C. and 300° C., e.g. 20° C., 30° C., 40° C., 50° C., 65° C., 80° C., 100° C., 120° C., 150° C., 175° C., 200° C., 225° C., 260° C., 275° C., 285° C. or 300° C.

Optionally, the modifier is any one selected from the group consisting of coal pitch, petroleum pitch, mesophase pitch, phenolic resin, epoxy resin, petroleum resin, coal tar and heavy oil, or a mixture of at least two selected therefrom. But the modifier is not limited to the modifiers listed above, and other modifiers that meet the following conditions can also be used in the present application: ① being softened and flowing at a certain temperature so that part of them fills the gaps of the natural graphite and is adsorbed on the inner surface, and the other part remains on the surface of natural graphite; ② being converted into non-graphitized carbon through carbonization treatment.

In the present application, the typical but non-limiting examples of the mixture of modifiers include: a mixture of coal pitch and petroleum pitch, a mixture of coal pitch and mesophase pitch, a mixture of phenolic resin and epoxy resin, a mixture of phenolic resin, epoxy resin and petroleum resin, a mixture of coal tar and heavy oil, a mixture of coal tar, petroleum resin, coal tar and heavy oil, and a mixture of coal tar, petroleum pitch, mesophase pitch, phenolic resin, epoxy resin and heavy oil, etc.

Optionally, the temperature for the carbonization treatment is 800° C.-3000° C., e.g. 800° C., 900° C., 1000° C., 1200° C., 1500° C., 1650° C., 1800° C., 2000° C., 2250° C., 2600° C., 2800° C., 2900° C. or 3000° C., etc.

Optionally, the modified composite material has a particle size of 5 μm-30 μm, e.g. 5 μm, 10 μm, 15 μm, 20 μm, 25 μm, 27 μm, 28 μm or 30 μm, etc.

The natural graphite-based modified composite material of the present application has a high degree of isotropy.

From XRD characterization, the $I_{002}/I_{110}$ value is less than 39, e.g. 38, 37, 36, 35, 33 or 30, etc.

In the second aspect, the present application provides a method for preparing a natural graphite-based modified composite material according to the first aspect, the method comprising the following steps:

(1) isotropic treatment: subjecting natural spherical graphite to isotropic treatment;

(2) granularity control and shaping treatment: subjecting the material after isotropic treatment to pulverization and classification treatment;

(3) simultaneous modification of the inner surface and the outer surface of the material: adding the pulverized and classified material and a modifier to the reaction container, and heating and stirring at a constant temperature under an inert atmosphere;

(4) conducting carbonization treatment under an inert atmosphere, so as to obtain the natural graphite-based modified composite material.

In the present application, the machine selected for the classification step in step (2) is a classification and shaping integrated machine. Therefore, the purposes of classification and shaping can be achieved simultaneously through step (2).

In the present application, the reaction container described in step (3) may be, for example, a conventional protective atmosphere stirring heater.

In step (3) of the method of the present application, a part of the softened and flowing modifier will fill the gaps of the isotropic sample at a constant temperature, and be adsorbed on the inner surface of the natural spherical graphite; a part of the modifier will remain on the surface of the natural spherical graphite so as to realize the simultaneous modification and integration of the defect sites on the inner and outer surfaces of natural graphite. Moreover, the product of the present application has a high degree of isotropy, and the synergistic effect reduces the electrode expansion rate and improves the electrochemical performance of the material.

As an optional technical solution of the method described in the present application, the average particle size of the natural spherical graphite in step (1) is 3 μm to 30 μm, e.g. 3 μm, 5 μm, 7 μm, 8 μm, 10 μm, 12 μm, 15 μm, 17.5 μm, 20 μm, 22 μm, 23 μm, 25 μm, 26 μm, 28 μm, or 30 μm, etc.

In the present application, the isotropic treatment refers to performing pressure treatment on the material in at least two directions by using external pressure.

Optionally, the equipment used for the isotropic treatment in step (1) comprises an isostatic pressing device, a roller press, or a compressor, but is not limited to the equipment listed above.

Other equipments which are commonly used in the art and can achieve the same isotropic effect can also be used in the present application.

Optionally, the medium used in the isotropic treatment in step (1) includes, but is not limited to, any one in a gaseous state or in a liquid state.

Optionally, the isotropic treatment in step (1) is cold isostatic pressing.

Optionally, the processing pressure during the isotropic treatment in step (1) is 10 MPa-500 MPa, e.g. 10 MPa, 25 MPa, 30 MPa, 50 MPa, 60 MPa, 80 MPa, 100 MPa, 120 MPa, 150 MPa, 200 MPa, 225 MPa, 260 MPa, 300 MPa, 330 MPa, 350 MPa, 380 MPa, 400 MPa, 450 MPa or 500 MPa, etc., optionally 10 MPa-300 MPa.

Optionally, the processing time during the isotropic treatment in step (1) is 1 min-60 min, e.g. 1 min, 5 min, 10 min, 15 min, 20 min, 25 min, 30 min, 35 min, 40 min, 50 min or 60 min, etc.

Optionally, the average particle size of the material obtained after the pulverization and classification treatment in step (2) is similar to that of the natural spherical graphite of the raw material in step (1), in a range of 33 μm-30 μm, e.g. 3 μm, 5 μm, 8 μm, 10 μm, 12 μm, 15 μm, 20 μm, 25 μm, 27.5 μm, 28.5 μm or 30 μm, etc.

Optionally, the modifier in step (3) is a modifier having a softening point of 20° C.–300° C., e.g. 20° C., 35° C., 50° C., 70° C., 80° C., 100° C., 120° C., 150° C., 200° C., 225° C., 260° C., 275° C., 285° C. or 300° C., etc.

Optionally, the modifier in step (3) is selected from the group consisting of coal pitch, petroleum pitch, mesophase pitch, phenol resin, epoxy resin, petroleum resin, coal tar and heavy oil, or a mixture of at least two selected therefrom. However, it is not limited to the modifiers listed above, and other modifiers that can meet the following conditions can also be used in this application: ① being softened and flowing at a certain temperature so that a part of them fills the gaps of the natural graphite and is adsorbed on the inner surface, and the other part remains on the surface of natural graphite; ② being carbonized into non-graphitized carbon.

In the present application, typical but non-limiting examples of the mixture of modifiers include: a mixture of coal pitch and petroleum pitch, a mixture of coal pitch and mesophase pitch, a mixture of phenolic resin and epoxy resin, a mixture of phenolic resin, epoxy resin and petroleum resin, a mixture of coal tar and heavy oil, a mixture of coal tar, petroleum resin, coal tar and heavy oil, and a mixture of coal tar, petroleum pitch, mesophase pitch, phenolic resin, epoxy resin and heavy oil, etc.

Optionally, the preparation ratio of the material after pulverization and classification treatment to the modifier in step (3) is 1:(0.05–1), e.g. 1:0.05, 1:0.06, 1:0.07, 1:0.08, 1:0.1, 1:0.2, 1:0.3, 1:0.4, 1:0.5, 1:0.6, 1:0.7, 1:0.8, 1:0.9 or 1:1, etc.

Optionally, the heating and stirring at a constant temperature in step (3) comprises heating to 30° C.-800° C. and keeping the temperature constant, e.g. heating to 30° C., 50° C., 80° C., 100° C., 200° C., 230° C., 270° C., 300° C., 350° C., 400° C., 450° C., 500° C., 600° C., 650° C., 700° C. or 800° C., etc. The temperature herein is selected depending on the softening point of the modifier so that such temperature is not lower than the softening point of the modifier, and that the modifier should undergo changes at this temperature as follows: flowing so that a part of them fills the gas of the natural graphite, and the other part remains on the surface of the natural graphite.

Optionally, in step (3), the constant temperature time is kept for a period of 0-300 min and excluding 0, e.g. 0.5 min, 2 min, 5 min, 10 min, 15 min, 20 min, 30 min, 45 min, 60 min, 80 min, 100 min, 150 min, 200 min, 220 min, 240 min, 270 min or 300 min, etc.

As an optional technical solution of the method described in the present application, the method further includes a step of stirring first before the heating in step (3), wherein the stirring time is optionally 10 min.

Optionally, the temperature for the carbonization treatment in step (4) is 800° C.-3000° C., e.g. 800° C., 900° C., 950° C., 1000° C., 1100° C., 1250° C., 1350° C., 1500° C., 1600° C., 1800° C., 2000° C., 2200° C., 2350° C., 2450° C., 2600° C., 2800° C. or 3000° C., etc.

Optionally, the time for the carbonization treatment in step (4) is 1 h-10 h, e.g. 1 h, 2 h, 3 h, 4 h, 5 h, 6 h, 7 h, 8 h, or 10 h, etc.

Optionally, the inert atmosphere in step (3) and step (4) is independently any one selected from the group consisting of a helium atmosphere, a neon atmosphere, an argon atmosphere, a nitrogen atmosphere and a radon atmosphere, or a combination of at least two selected therefrom.

As a further optional technical solution of the method described in the present application, the method includes the following steps:

(1) isotropic treatment: subjecting natural spherical graphite having an average particle size of 3 μm-30 μm to cold isostatic pressing under a pressure of 10 MPa-500 MPa for 1 min-60 min to achieve isotropic treatment;

(2) granularity control and shaping treatment: subjecting the material after isotropic treatment to pulverization and classification treatment so as to obtain the material having an average particle size of 3 μm-30 μm;

(3) simultaneous modification of the inner surface and the outer surface of the material: adding the pulverized and classified material and the modifier to the reaction container, stirring under an inert atmosphere for 10 min first, and then heating to 30° C.-800° C. and keeping the temperature constant for 0-300 min excluding 0;

(4) conducting carbonization treatment under an inert atmosphere at 800° C.-3000° C. for 1 h-10 h, so as to obtain the natural graphite-based modified composite material.

In the third aspect, the present application provides an anode sheet, wherein the anode sheet comprises the natural graphite-based modified composite material in the first aspect as an anode active material. The anode sheet made of the natural graphite-based modified composite material described in the first aspect has a low expansion rate, and the expansion rate electrode sheet after 20 cycles is less than 25%.

In the fourth aspect, the present application provides a lithium ion battery, wherein the lithium ion battery comprises the natural graphite-based modified composite material in the first aspect or the natural graphite-based modified composite material prepared according to the method in the second aspect.

As compared with related prior art, the present application has the following beneficial effects:

(1) The present application provides a new natural graphite-based modified composite material, wherein the modified composite material includes natural graphite and non-graphitizable carbon coated on the inner and outer surfaces of the natural graphite. Through the above coating, the simultaneous modification and integration of the defect sites on the inner and outer surfaces of natural graphite can be achieved, thereby improving the cycle performance and other electrochemical performances of natural graphite materials, and solving the problem of high expansion rate of natural graphite electrodes. The natural graphite-based modified composite material of the present application is suitable for lithium ion batteries for mobile electronic devices such as mobile phones and digital cameras, and power lithium ion batteries for electric vehicles.

(2) In the present application, the modification of defect sites on the inner and outer surfaces of a graphite material is simultaneously realized by stirring and heating impregnation for the first time, which can more effectively improve the cycle stability of natural graphite and reduce the expansion of natural graphite electrodes compared to related prior art. The natural graphite-based composite material obtained in the present application has a capacity retention rate of more than 92% after 300 charge and discharge cycles at room temperature, and an electrode expansion rate of less than 25% after 20 cycles.

(3) The method of the present application has simple process, easy operation, low production cost and high practicability.

Other aspects will become apparent upon reading and understanding the detailed description and accompanying drawings.

BRIEF DESCRIPTION OF THE DRAWINGS

FIG. 1 is a scanning electron microscope test chart of a natural graphite-based modified composite anode material in Example 1 of the present application.

DETAILED DESCRIPTION

The present invention is described in detail with reference to specific examples. The following examples will help those skilled in the art to further understand the present application, but should not be regarded as a specific limitation to the present application. For those skilled in the art, the present application may include various modifications and changes.

Unless otherwise specified, the methods in the following examples are conventional methods. The experimental materials used, unless otherwise specified, are used directly after being purchased from conventional biochemical reagent factories without any purification.

Example 1

Natural spherical graphite (having an average particle size of 15 μm) was subjected to cold isostatic pressing at a processing pressure of 130 MPa for 5 min. The isostatically pressed product was pulverized to the approximate particle size of the raw material and classified. Then the classified sample and coal tar (having a softening point of 110° C.) in the mass ratio of 85:15 were added to the stirring heater and stirred for 10 min, then heated to 300° C. and stirred at a constant temperature for 30 min, and subjected to carbonization treatment at 1200° C., to obtain a natural graphite-based modified composite anode material.

Electrochemical Performance Test:

The natural graphite-based composite material obtained in Example 1 was used as an anode active material. The mixture was uniformly mixed according to a mass ratio of active material: hydroxymethyl cellulose (CMC): styrene-butadiene rubber (SBR)=96.5:1.5:2, and then coated on the copper foil current collector. The anode sheet was obtained by drying for backup.

Button cell test: First, the button cell test was performed on the obtained anode sheet. The cell was assembled in an argon glove box, wherein a lithium metal sheet was used as the anode; the electrolyte was 1 mol/L $LiPF_6$+ethylene carbonate+methyl carbonate vinyl ester ($LiPF_6$+EC+EMC); the separator was a polyethylene/propylene composite microporous membrane. The electrochemical performance test was performed on a battery tester. The charge and discharge voltage was 0.01-1.5 V, and the charge and discharge rate was 0.1 C. The cycle performance and electrode expansion rate are shown in Table 1.

Finished battery test: The natural graphite-based composite material obtained in Example 1, a conductive agent, CMC and SBR were mixed in a mass ratio of 95:1.5:1.5:2 and coated on copper foil to obtain an anode sheet. The cathode active material LiCoO$_2$, a conductive agent and polyvinylidene fluoride (PVDF) were mixed uniformly in a mass ratio of 96.5:2:1.5, and then coated on an aluminum foil to obtain a cathode sheet. The electrolyte was 1 mol/L LiPF$_6$+EC+EMC, and the separator was a polyethylene/polypropylene composite microporous membrane. It was charged and discharged at room temperature at a rate of 1 C. The voltage range was 3.0-4.25 V.

FIG. 1 is a scanning electron microscope result of graphite particles in Example 1.

In order to characterize the isotropy of the material, XRD test analysis was performed on the material, and the results are listed in Table 1. The tests in the following examples were the same.

Example 2

Natural spherical graphite (having an average particle size of 10 μm) was subjected to cold isostatic pressing at a processing pressure of 100 MPa for 5 min. The isostatically pressed product was pulverized to the approximate particle size of the raw material and classified. Then the classified sample and coal tar (having a softening point of 110° C.) in the mass ratio of 60:40 were added to the stirring heater and stirred for 10 min, then heated to 300° C. and stirred at a constant temperature for 30 min, and subjected to carbonization treatment at 1200° C., to obtain a natural graphite-based modified composite anode material.

The anode was prepared by the same method as in Example 1. The button cell and the finished battery were assembled, and the performance tests were performed. The obtained cycle performance and electrode expansion rate are listed in Table 1.

The XRD test was performed in the same manner as in Example 1. The results obtained are shown in Table 1.

Example 3

Natural spherical graphite (having an average particle size of 8 μm) was subjected to cold isostatic pressing at a processing pressure of 80 MPa for 5 min. The isostatically pressed product was pulverized to the approximate particle size of the raw material and classified. Then the classified sample and coal tar (having a softening point of 110° C.) in the mass ratio of 90:10 were added to the stirring heater and stirred for 10 min, then heated to 300° C. and stirred at a constant temperature for 30 min, and subjected to carbonization treatment at 1100° C., to obtain a natural graphite-based modified composite anode material.

The anode was prepared by the same method as in Example 1. The button cell and the finished battery were assembled, and the performance tests were performed. The obtained cycle performance and electrode expansion rate are listed in Table 1.

The XRD test was performed in the same manner as in Example 1. The results obtained are shown in Table 1.

Example 4

Natural spherical graphite (having an average particle size of 15 μm) was subjected to cold isostatic pressing at a processing pressure of 50 MPa for 15 min. The isostatically pressed product was pulverized to the approximate particle size of the raw material and classified. Then the classified sample and coal tar (having a softening point of 250° C.) in the mass ratio of 95:5 were added to the stirring heater and stirred for 10 min, then heated to 400° C. and stirred at a constant temperature for 30 minutes, and subjected to carbonization treatment at 2800° C., to obtain a natural graphite-based modified composite anode material.

The anode was prepared by the same method as in Example 1. The button cell and the finished battery were assembled, and the performance tests were performed. The obtained cycle performance and electrode expansion rate are listed in Table 1.

The XRD test was performed in the same manner as in Example 1. The results obtained are shown in Table 1.

Example 5

Natural spherical graphite (having an average particle size of 15 μm) was subjected to cold isostatic pressing at a processing pressure of 30 MPa for 20 min. The isostatically pressed product was pulverized to the approximate particle size of the raw material and classified. Then the classified sample and coal tar (having a softening point of 250° C.) in the mass ratio of 90:10 were added to the stirring heater and stirred for 10 min, then heated to 400° C. and stirred at a constant temperature for 30 min, and subjected to carbonization treatment at 1200° C., to obtain a natural graphite-based modified composite anode material.

The anode was prepared by the same method as in Example 1. The button cell and the finished battery were assembled, and the performance tests were performed. The obtained cycle performance and electrode expansion rate are listed in Table 1.

The XRD test was performed in the same manner as in Example 1. The results obtained are shown in Table 1.

Example 6

Natural spherical graphite (having an average particle size of 15 μm) was subjected to pressing (in a pressor) at a processing pressure of 10 MPa for 30 min. The isostatically pressed product was pulverized to the approximate particle size of the raw material and classified. Then the classified sample and coal tar (having a softening point of 160° C.) in the mass ratio of 80:20 were added to the stirring heater and stirred for 10 min, then heated to 300° C. and stirred at a constant temperature for 60 minutes, and subjected to carbonization treatment at 1200° C., to obtain a natural graphite-based modified composite anode material.

The anode was prepared by the same method as in Example 1. The button cell and the finished battery were assembled, and the performance tests were performed. The obtained cycle performance and electrode expansion rate are listed in Table 1.

The XRD test was performed in the same manner as in Example 1. The results obtained are shown in Table 1.

Example 7

Natural spherical graphite (having an average particle size of 8 μm) was subjected to pressing (in a pressor) at a processing pressure of 10 MPa for 30 min. The isostatically pressed product was pulverized to the approximate particle size of the raw material and classified. Then the classified sample and coal tar (having a softening point of 160° C.) in the mass ratio of 90:10 were added to the stirring heater and stirred for 10 min, then heated to 300° C. and stirred at a constant temperature for 30 minutes, and subjected to carbonization treatment at 1100° C., to obtain a natural graphite-based modified composite anode material.

The anode was prepared by the same method as in Example 1. The button cell and the finished battery were assembled, and the performance tests were performed. The obtained cycle performance and electrode expansion rate are listed in Table 1.

The XRD test was performed in the same manner as in Example 1. The results obtained are shown in Table 1.

Example 8

Natural spherical graphite (having an average particle size of 15 μm) was subjected to pressing (in a pressor) at a processing pressure of 10 MPa for 60 min. The isostatically pressed product was pulverized to the approximate particle size of the raw material and classified. Then the classified sample and coal tar (having a softening point of 110° C.) in the mass ratio of 90:10 were added to the stirring heater and stirred for 10 min, then heated to 300° C. and stirred at a constant temperature for 60 minutes, and subjected to carbonization treatment at 3000° C., to obtain a natural graphite-based modified composite anode material.

The anode was prepared by the same method as in Example 1. The button cell and the finished battery were assembled, and the performance tests were performed. The obtained cycle performance and electrode expansion rate are listed in Table 1.

The XRD test was performed in the same manner as in Example 1. The results obtained are shown in Table 1.

Comparative Example 1

This comparative example is the raw natural spherical graphite in Example 1 having an average particle size of about 15 μm.

The anode was prepared by the same method as in Example 1. The button cell and the finished battery were assembled, and the performance tests were performed. The obtained cycle performance and electrode expansion rate are listed in Table 1.

The XRD test was performed in the same manner as in Example 1. The results obtained are shown in Table 1.

TABLE 1

| Samples | Particle size D50 of the final sample (Micron) | $I_{002}/I_{110}$ | Capacity retention rate after 300 cycles at room temperature (%) | expansion rate of electrode sheet after 20 cycles |
|---|---|---|---|---|
| Example 1 | 15.8 | 38.4 | 92.3 | 24.4% |
| Example 2 | 10.3 | 38.7 | 92.4 | 25.1% |
| Example 3 | 8.1 | 38.9 | 92.1 | 25.5% |
| Example 4 | 15.5 | 39.0 | 92.0 | 24.9% |
| Example 5 | 15.4 | 37.9 | 91.8 | 25.3% |
| Example 6 | 15.6 | 38.6 | 92.5 | 24.6% |
| Example 7 | 8.4 | 37.4 | 92.4 | 25.6% |
| Example 8 | 15.3 | 38.2 | 91.7 | 25.0% |
| Comp. Exp. 1 | 15.2 | 48.6 | 84.5 | 31.1% |

It can be seen from Table 1 that, based on the $I_{002}/I_{110}$, the capacity retention rate after 300 cycles at room temperature and the expansion rate of electrode sheet after 20 cycles in Examples 1-8, the natural graphite-based modified composite materials prepared in Examples 1-8 have a significantly reduced 1002/1110 value compared to the raw material natural spherical graphite, indicating that the isotropy degree of the composite material after synthesis has been significantly improved. The corresponding capacity retention rate of this type of material after 300 cycles at normal temperature has increased by more than 7%, and the expansion rate of electrode sheet after 20 cycles has been reduced by more than 5%.

The applicant states that the present application discloses the detailed methods by the above examples, but the present application is not limited to the detailed methods described above, that is, it does not mean that the present application must rely on the above detailed methods to implement.

What is claimed is:

1. A natural graphite-based modified composite material, wherein the modified composite material comprises natural graphite and non-graphitized carbon coated on the inner and outer surfaces of the natural graphite, wherein the modified composite material has a $I_{002}/I_{110}$ value of less than 39 as measured by XRD test analysis.

2. The modified composite material according to claim 1, wherein the non-graphitized carbon is converted from a modifier through carbonization treatment.

3. The modified composite material according to claim 2, wherein the modifier is a modifier having a softening point of 20° C.–300° C.

4. The modified composite material according to claim 3, wherein the modifier comprises any one selected from the group consisting of coal pitch, petroleum pitch, mesophase pitch, phenolic resin, epoxy resin, petroleum resin, coal tar and heavy oil, or a mixture of at least two selected therefrom.

5. The modified composite material according to claim 2, wherein the temperature for the carbonization treatment is 800° C. –3000° C.

6. The modified composite material according to claim 1, wherein the modified composite material has a particle size of 5 μm-30 μm.

7. A method for preparing the modified composite material according to claim 1, comprising the following steps:
(1) isotropic treatment: subjecting natural spherical graphite to isotropic treatment;
(2) granularity control and shaping treatment: subjecting the material after isotropic treatment to pulverization and classification treatment;
(3) simultaneous modification of the inner surface and the outer surface of the material: adding the pulverized and classified material and a modifier to the reaction container, and heating to 30° C.–800° C. and keeping the temperature constant and stirring under an inert atmosphere;
(4) conducting carbonization treatment under an inert atmosphere, so as to obtain the natural graphite-based modified composite material.

8. The method according to claim 7, wherein the isotropic treatment in step (1) is cold isostatic pressing.

9. The method according to claim 7, wherein the natural spherical graphite in step (1) has an average particle size of 3 μm-30 μm.

10. The method according to claim 7, wherein the processing pressure ranges from 10 MPa-500 MPa, during the isotropic treatment in step (1).

11. The method according to claim 7, wherein the material obtained after pulverization and classification treatment in step (2) has an average particle size of 3 μm-30 μm.

12. The method according to claim 7, wherein the modifier in step (3) is a modifier having a softening point of 20° C.–300° C.

13. The method according to claim 7, wherein the preparation mass ratio of the material after pulverization and classification treatment to the modifier is 1:(0.05-1) in step (3).

14. The method according to claim 7, wherein the method further includes a step of stirring before the heating in step (3), wherein the stirring time is 10 min.

15. The method according to claim 7, wherein the temperature for the carbonization treatment in step (4) is 800° C. to 3000° C.

16. The method according to claim 7, wherein the time for the carbonization treatment in step (4) is 1 h-10 h.

17. The method according to claim 7, wherein the method comprises the following steps:
(1) isotropic treatment: subjecting natural spherical graphite having an average particle size of 3 μm-30 μm to cold isostatic pressing under a pressure of 10 MPa-500 MPa for 1 min-60 min to achieve isotropic treatment;
(2) granularity control and shaping treatment: subjecting the material after isotropic treatment to pulverization and classification treatment so as to obtain the material having an average particle size of 3 μm-30 μm;
(3) simultaneous modification of the inner surface and the outer surface of the material: adding the pulverized and classified material and the modifier to the reaction container, stirring under an inert atmosphere for 10 min first, and then heating to 30° C.–800° C. and keeping the temperature constant, stirring for 0-300 min excluding 0;
(4) conducting carbonization treatment under an inert atmosphere at 800° C.–3000° C. for 1 h-10 h, so as to obtain the natural graphite-based modified composite material.

18. A lithium ion battery, wherein the lithium ion battery comprises the natural graphite-based modified composite material according to claim 1.

* * * * *